United States Patent [19]

Chang

[11] 3,857,935

[45] Dec. 31, 1974

[54] THERAPEUTIC AGENT DERIVED FROM THE BACTERIUM ACHROMOBACTER STENOHALIS FOR TREATMENT OF CANINE INFECTIOUS HEPATITIS

[76] Inventor: Joseph K. Chang, 3-21, 6-chome Seijomachi, Setagaya-ku, Tokyo, Japan

[22] Filed: Aug. 16, 1971

[21] Appl. No.: 172,302

[52] U.S. Cl. .................................. 424/95, 424/92
[51] Int. Cl. ...................... A61k 17/00, A61k 27/00
[58] Field of Search ................................ 424/92, 95

[56] References Cited
OTHER PUBLICATIONS

Chem. Abst. Subject Index 7th collective Vol. 56–65 (1962–1966), p. 449S.

Primary Examiner—Sam Rosen
Attorney, Agent, or Firm—Sidney G. Faber

[57] ABSTRACT

Canine infectious hepatitis is treated by administering to the animal a therapeutic agent containing the filtrate of an admixture of water and inactivated bacteria belonging to *Achromobacter stenohalis*.

6 Claims, No Drawings

THERAPEUTIC AGENT DERIVED FROM THE BACTERIUM ACHROMOBACTER STENOHALIS FOR TREATMENT OF CANINE INFECTIOUS HEPATITIS

BACKGROUND OF THE INVENTION

The existence of canine infectious hepatitis was recognized by Fujimoto et al. in 1941 (cf. The Veterinary Studies, page 175, 1953) and the viruses causing this disease have also been isolated. However, no practical, efficient therapeutic agent has been developed for the prevention and cure of the disease.

Accordingly, it is the object of this invention to provide a therapeutic agent for the treatment of canine infectious hepatitis and a method of treating the disease.

SUMMARY OF THE INVENTION

This invention relates to the treatment of canine infectious hepatitis, and more particularly relates to the treatment of this disease with a therapeutic agent containing the filtrate of an admixture of water and inactivated bacteria of *Achromobacter stenohalis*.

DESCRIPTION OF THE PREFERRED EMBODIMENTS

The therapeutic agent of the present invention is prepared by a process which includes the steps of inoculating a seed of the bacterium into a culture medium of *Achromobacter stenohalis* in which there is dissolved about 0.1% to about 10% by weight of an inorganic salt, incubating the inoculated medium for a period sufficient to grow the bacterium, inactivating the bacterium, and admixing the bacterium with water.

The bacterium *Achromobacter stenohalis*, from which the microbiol product of this invention is derived has been isolated from sea water, marine mud and marine phytoplankton. A strain of *Achromobacter stenohalis* has been deposited at the American Type Culture Collection as Deposit No. 21710 . Further details with respect to the identity of the bacterium can be found in my Japanese Pat. No. 578,762.

The bacteria is cultivated in an inorganic salt containing agar medium or semi-synthetic medium which can optionally contain a nutrient such as glucose and pepton. The salt concentration in the agar medium is critical and must be within the range of about 0.1–10 weight percent. Preferably, the concentration of the salt, such as sodium chloride or magnesium chloride, is about 0.5% to 8% and most preferably about 3–5 weight percent.

A nutrient or a mixture of nutrients is advantageously employed in the preparation of an agar cultivation of *Achromobacter stenohalis*. Conventional nutrients which usually contain protein may be used. For example, the medium can contain 5% of dextrose as a source of carbon and 0.5–1% peptone as a source of nitrogen.

A preferred temperature for the cultivation is about 20°–37° C. and preferably about 25°–28° C. Within the preferred temperature range, the incubation period is 24–48 hours.

The resulting nutrient agar preferably has a pH of about 6.5 to 7.2. The agar is used in the usual manner to prepare an agar slant which is then inoculated with a suitable amount of a seed of actively growing culture for the cultivation of *Achromobacter stenohalis*. For a 500 ml culture medium, 3 ml of seed is generally adequate. During the incubation period, the culture should be ventilated and shaken.

After incubation, the bacterial bodies are collected and then inactivated. This can be accomplished by mixing the bacterial bodies with distilled water in an equal amount or double the amount of the bodies, and heating the mixture to about 56°–70° C., for about 30–45 minutes, preferably about 30 minutes. If desired, other methods of inactivation can be employed, such as exposure to ultraviolet radiation or the addition of an aldehyde such as formalin. Also, if desired, the bacterial bodies can be frozen and melted as described in my aforementioned Japanese patent.

Although the inactivated bacteria-water admixture can be used without further treatment, it is preferred to remove the thick mucous substance covering the bacterial bodies. This is accomplished in a high speed centrifuge (15,000 to 20,000 RPM), normally for a period of 15–60 minutes. The bacterial bodies are thereafter differentiated in the same apparatus. It is desirable that the centrifugal operation be repeated several times. The bacterial bodies after separation from their mucous coating are triturated mechanically, for example, by the new plane method. In the new plane method, masses of the bacterial bodies are placed between two sheets of glass and the sheets are rubbed against each other to finely divide the bacterial bodies. Distilled water, in an amount up to about 15 times the triturate, is added and the aqueous triturate is sterilized, e.g., by heating for 30 minutes at 60°–70° C. and asceptically filtered. The filtrate constitutes the therapeutic agent of this invention.

The toxicity of the therapeutic agent has been determined in mice and dogs. In mice, the $LD_{50}$ of intraperitoneal administration is 219 ml/kg. In dogs, toxicity was tested by injecting gluteally 5 ml of the therapeutic agent on the third, fourth and fifth day of the test, and the animals were kept under observation for 12 days. They showed evidence of considerable pain for 2 or 3 minutes after injection, but no induration on the site of injection nor any other side effects. Thus, no toxicity reaction to this administration of 5 times the normal therapeutic dosage was observed.

The following Examples are set forth to further illustrate the invention, but are not intended to limit it. Unless otherwise specified throughout this specification and claims, all parts and percentages are by weight and all temperatures are in degrees centigrade.

EXAMPLE 1

Preparation of the Therapeutic Agent

*Achromobacter stenohalis* (ATCC 21710 ) was incubated on an agar culture medium which contains 0.5% dextrose, 0.5% peptone and 3% magnesium chloride. After incubation for 48 hours at 28° C., 500 mg. of the bacterial bodies were collected. One liter of distilled water was mixed well with the bacterial bodies with stirring and the resulting mixture was frozen at −20° C. Thereafter, the frozen mixture was allowed to melt at room temperature followed by heating to 65° C. for 30 minutes.

EXAMPLE 2

Treatment of Canine Infectious Hepatitis

In this Example, 5 month old uterine dogs weighing 7 kg were employed. The animals were examined to make sure that they had no abnormalities on palpitation, that the test for neutralizing antibodies in the blood was negative, and that their leucocyte count showed no abnormal reduction. The hepatitis virus employed was the D43 strain which had been isolated in 1954.

Each dog was artificially infected by inoculation intraperitoneally with the virus. Then, the dogs were divided into two groups, one containing five dogs and the other containing three dogs. 5 days after inoculation with the D43 strains, the group containing five dogs received an intramuscular injection of 1 ml of the therapeutic agent of Example 1. Administration of the therapeutic agent was continued for 10 consecutive days.

4 days after the artificial infection, the body temperature of both groups of dogs had risen until it reached more than 40° C., and the leucocyte counts were found to have been reduced. 10 days after infection (6 days after institution of treatment), the treated group became aferbrile, their leucocyte count gradually returned to normal, and 10 days after institution of treatment they had almost completely recovered. Thus, all five treated dogs were completely cured while the three control dogs perished 7 or 8 days after the artificial infection.

EXAMPLE 3

In vitro tissue culture tests were conducted on the therapeutic agent of this invention. When the therapeutic agent of Example 1 was tested, the tissue culture test showed a marked manifestation of CPE phenomenon (a phenomenon in which cells are pathologically destroyed).

An additional test was made with the therapeutic agent of Example 1 which had further been subjected to high speed centrifugation to remove the mucous substance surrounding the bacterial bodies. The bodies were then triturated, washed with water and the filtrate recovered. In this test, the cells did not manifest any CPE phenomenon.

While the in vitro testing indicated that the removal of the mucous substances from the bacterial bodies was necessary, the result of Example 2 clearly demonstrates that the drug with the mucous membrane on the bacterial bodies had therapeutic effect. It is therefore concluded that the mucous substance on the bacterial bodies is also capable of promoting the production of the necessary antibodies to canine infectious hepatitis. The in vitro testing also demonstrates that use of the purified therapeutic agent, i.e., the filtrate of the water-inactivated bacteria admixture, is preferable.

Various changes and modifications can be made in the process and product of this invention without departing from the spirit and the scope thereof. The various embodiments disclosed herein serve to further illustrate the invention but are not intended to limit it.

I claim:

1. A therapeutic agent for the treatment of canine infectious hepatitis which comprises the filtrate of an admixture of water and inactivated bodies of a bacteria belonging to *Achromobacter stenohalis*.

2. The therapeutic agent of claim 1 wherein the bacteria has been heat inactivated.

3. The therapeutic agent of claim 1 wherein the inactivated bodies in the admixture have been triturated.

4. A method of treating canine infectious hepatitis which comprises administering to the canine an effective curative amount of the therapeutic agent of claim 1.

5. The method of claim 4 wherein the therapeutic agent is administered intramuscularly.

6. The method of claim 4 wherein the dosage of the therapeutic agent administered is 1 milliliter per day.

* * * * *